United States Patent
Lee et al.

(10) Patent No.: US 10,601,891 B2
(45) Date of Patent: Mar. 24, 2020

(54) CLOUD STREAMING SERVICE SYSTEM AND CLOUD STREAMING SERVICE METHOD FOR UTILIZING AN OPTIMAL GPU FOR VIDEO DECODING BASED ON RESOURCE CONDITIONS, AND APPARATUS FOR THE SAME

(71) Applicant: SK PLANET CO., LTD., Seongnam-si, Gyeonggi-do (KR)

(72) Inventors: Dong-Su Lee, Seongnam-si (KR); Hong-Seo Yun, Incheon (KR)

(73) Assignee: SK PLANET CO., LTD., Seongnam-si, Gyeonggi-do (KR)

( * ) Notice: Subject to any disclaimer, the term of this patent is extended or adjusted under 35 U.S.C. 154(b) by 99 days.

(21) Appl. No.: 15/514,388

(22) PCT Filed: Jul. 13, 2015

(86) PCT No.: PCT/KR2015/007262
§ 371 (c)(1),
(2) Date: Mar. 24, 2017

(87) PCT Pub. No.: WO2016/052845
PCT Pub. Date: Apr. 7, 2016

(65) Prior Publication Data
US 2017/0302721 A1    Oct. 19, 2017

(30) Foreign Application Priority Data
Oct. 2, 2014  (KR) .......................... 10-2014-0133177

(51) Int. Cl.
G06F 15/16    (2006.01)
H04L 29/06    (2006.01)
(Continued)

(52) U.S. Cl.
CPC ........ H04L 65/607 (2013.01); H04L 65/1063 (2013.01); H04L 65/601 (2013.01);
(Continued)

(58) Field of Classification Search
CPC ............... H04L 65/607; H04L 65/1063; H04L 65/4069; H04N 21/234; H04N 21/236
(Continued)

(56) References Cited

U.S. PATENT DOCUMENTS 8,751,658 B2    6/2014  Yamasaki et al.
8,903,958 B1 *  12/2014  Chavez ................... H04L 67/10
                                                            709/219
(Continued)

FOREIGN PATENT DOCUMENTS

CN    102857533 A    1/2013
CN    103237037 A    8/2013
(Continued)

OTHER PUBLICATIONS

European Search Report dated Mar. 20, 2018, issued in corresponding European Patent Application No. 15847254.8, citing the above reference(s).
(Continued)

*Primary Examiner* — Bharat Barot
(74) *Attorney, Agent, or Firm* — Fenwick & West LLP

(57) ABSTRACT

A cloud streaming service system, a cloud streaming service method using an optimal GPU, and an apparatus for the same are disclosed. A cloud streaming service can be provided by determining whether a video is played on a browser, when a playback of the video is sensed, decoding the video by using a video decoding entity determined on the basis of system resource conditions, and performing a streaming procedure corresponding to capturing, encoding and sending the decoded video. When a video is provided
(Continued)

through the cloud streaming service, it is possible to effectively use the resources of a cloud streaming system by efficiently distributing a plurality of GPUs equipped in the cloud streaming system.

14 Claims, 4 Drawing Sheets

(51) Int. Cl.
    *H04N 21/234*    (2011.01)
    *H04N 21/236*    (2011.01)
    *H04N 21/20*    (2011.01)
    *H04N 21/24*    (2011.01)
    *H04N 21/81*    (2011.01)
    *H04N 21/222*    (2011.01)
    *H04N 21/61*    (2011.01)
    *H04N 21/4782*    (2011.01)

(52) U.S. Cl.
    CPC ........... *H04N 21/20* (2013.01); *H04N 21/222* (2013.01); *H04N 21/234* (2013.01); *H04N 21/236* (2013.01); *H04N 21/2405* (2013.01); *H04N 21/6125* (2013.01); *H04N 21/816* (2013.01); *H04N 21/4782* (2013.01)

(58) Field of Classification Search
    USPC .................................. 709/201–203, 217–219
    See application file for complete search history.

(56) References Cited

U.S. PATENT DOCUMENTS

| | | | | |
|---|---|---|---|---|
| 9,026,619 | B2 * | 5/2015 | Lee ..................... | H04L 12/2836 709/219 |
| 2003/0158913 | A1 | 8/2003 | Agnoli et al. | |
| 2012/0143986 | A1 * | 6/2012 | Robinson ................ | H04L 67/06 709/217 |
| 2012/0167151 | A1 | 6/2012 | Cho | |
| 2013/0096904 | A1 * | 4/2013 | Hui ....................... | H04L 65/605 703/21 |
| 2015/0116342 | A1 * | 4/2015 | Haase ..................... | G06T 1/60 345/555 |
| 2015/0127774 | A1 * | 5/2015 | Hitomi .................... | H04L 65/60 709/219 |
| 2015/0365453 | A1 * | 12/2015 | Cheng ................. | H04L 65/4092 709/219 |
| 2016/0328281 | A1 * | 11/2016 | Lee ....................... | G06F 11/277 |
| 2017/0279866 | A1 * | 9/2017 | Bertrand ............... | H04L 65/607 |

FOREIGN PATENT DOCUMENTS

| | | |
|---|---|---|
| JP | 2006-020147 A | 1/2006 |
| JP | 2006-268246 A | 10/2006 |
| JP | 2012-134969 A | 7/2012 |
| JP | 2012-216058 A | 11/2012 |
| KR | 10-2012-0019711 A | 3/2012 |
| KR | 10-2012-0105970 A | 9/2012 |
| KR | 10-2012-0138567 A | 12/2012 |
| KR | 10-2013-0011714 A | 1/2013 |
| KR | 10-2013-0066069 A | 6/2013 |
| KR | WO 2013-180348 A1 | 12/2013 |
| KR | 10-2014-0035707 A | 3/2014 |

OTHER PUBLICATIONS

International Search Report dated Oct. 22, 2015 for PCT/KR2015/007262 citing the above reference(s).

Koichiro Ishikawa et al., "Effective Sharing of Digital Multimedia Content Viewing History", The Journal of the Institute of Image Information and Television Engineers, Jun. 1, 2007, vol. 61, No. 6, pp. 860-867, ISSN:1342-6907.

* cited by examiner

CLOUD STREAMING SERVICE SYSTEM AND CLOUD STREAMING SERVICE METHOD FOR UTILIZING AN OPTIMAL GPU FOR VIDEO DECODING BASED ON RESOURCE CONDITIONS, AND APPARATUS FOR THE SAME

TECHNICAL FIELD

The present invention relates to a cloud streaming service system, a cloud streaming service method using an optimal GPU, and an apparatus for same, and more particularly to a cloud streaming service capable of streaming a video of a web application by selecting the optimal GPU for the service from among multiple GPUs equipped in the system.

CROSS-REFERENCE TO RELATED APPLICATION

This present application is a national stage filing under 35 U.S.C § 371 of PCT application number PCT/KR2015/007262 filed on Jul. 13, 2015 which is based upon and claims the benefit of priority to Korean Patent Application Nos. 10-2014-0133177 filed on Oct. 2, 2014 in the Korean Intellectual Property Office. The disclosures of the above-listed applications are hereby incorporated by reference herein in their entirety.

BACKGROUND

As the cloud streaming service has become popular, a variety of media that can be serviced through the cloud system have been developed. Requests for services regarding such various media are difficult to be processed only by a central processing unit (CPU) of the cloud system. In order to solve this problem, a technique that can provide the cloud service by more efficiently utilizing resources of the system through a distribution of packet processing in the CPU to a graphics processing unit (GPU) has been developed and is widely used.

In a video cloud streaming service using the output result of a browser, there is a case where a general-purpose browser itself determines a decoder to decode a video rather than using the optimal decoder of the system. For example, the chrome browser performs software decoding based on system requirements for decoding of the 264 video or fixedly uses the main GPU when there are several GPUs. That is, in many cases, system resources are not used optimally.

According to disclosure of Korean Patent Publication No. 10-2012-0138567, when a mobile phone captures a content playback device and transmits a captured image to a server, the server extracts a code of the content playback device from the captured image and then, based on the extracted code, converts and provides the content.

A relevant technique is also disclosed in Korean Patent Publication No. 10-2012-0019711 (Title: Network architecture and method for processing packet data using the same) published on Mar. 7, 2012.

SUMMARY

An object of the present invention is to effectively use resources of a cloud streaming system by efficiently distributing a plurality of GPUs equipped in the cloud streaming system when a video is provided through a cloud streaming service.

Additionally, an object of the present invention is to provide a cloud streaming service method capable of maximizing the effect of optimally using resources equipped in a cloud streaming system at a small cost.

Also, an object of the present invention is to provide a service to a user smoothly, based on efficient resource management of a cloud streaming system.

In order to achieve the above objects, a cloud streaming server according to the present invention includes a video playback determining unit configured to determine whether a video is played on a browser; a decoding unit configured to, when a playback of the video is sensed, decode the video by using a video decoding entity determined on the basis of system resource conditions; and a control unit configured to perform a streaming procedure corresponding to capturing, encoding and sending the decoded video and to provide a cloud streaming service to a user terminal.

In the cloud streaming server, the decoding unit may include a graphics processing unit (GPU) usage measuring unit configured to measure usage rates of at least two or more GPUs; and a GPU determining unit configured to determine, as the video decoding entity, a GPU having the lowest usage rate among the at least two or more GPUs, based on the usage rates of the at least two or more GPUs.

In the cloud streaming server, the GPU usage measuring unit may be further configured to calculate load amounts of the at least two or more GPUs and to measure the usage rate higher when the load amount is larger.

In the cloud streaming server, the video playback determining unit may be further configured to determine whether the video is played, by detecting an event corresponding to a video playback occurring on the browser.

In the cloud streaming server, the GPU determining unit may be further configured to, if all of the at least two or more GPUs have usage rates smaller than a predetermined reference usage rate, decode the video by using a main GPU among the at least two or more GPUs.

In the cloud streaming server, the main GPU may be a GPU having the best decoding performance among the at least two or more GPUs.

Additionally, a cloud streaming service method using an optimal GPU according to the present invention includes steps of determining whether a video is played on a browser; when a playback of the video is sensed, decoding the video by using a video decoding entity determined on the basis of system resource conditions; and providing a cloud streaming service to a user terminal by performing a streaming procedure corresponding to capturing, encoding and sending the decoded video.

In the method, the decoding step may include steps of measuring usage rates of at least two or more graphics processing unit (GPUs); and determining, as the video decoding entity, a GPU having the lowest usage rate among the at least two or more GPUs, based on the usage rates of the at least two or more GPUs.

In the method, the step of measuring the usage rates may be performed by calculating load amounts of the at least two or more GPUs and measuring the usage rate higher when the load amount is larger.

In the method, the step of determining whether the video is played may be performed by detecting an event corresponding to a video playback occurring on the browser.

In the method, the step of determining the GPU may include, if all of the at least two or more GPUs have usage rates smaller than a predetermined reference usage rate, decoding the video by using a main GPU among the at least two or more GPUs.

In the method, the main GPU may be a GPU having the best decoding performance among the at least two or more GPUs.

Additionally, as another technical solution, the present invention provides a computer program, stored in a medium, for executing the aforesaid method.

Additionally, a cloud streaming system according to the present invention includes a cloud streaming server configured to determine whether a video is played on a browser, to decode, when a playback of the video is sensed, the video by using a video decoding entity determined on the basis of system resource conditions, and to provide a cloud streaming service to a user terminal by performing a streaming procedure corresponding to capturing, encoding and sending the decoded video; and a terminal configured to receive an application execution result screen corresponding to the cloud streaming server from the cloud streaming server.

According to this invention, it is possible to effectively use resources of a cloud streaming system by efficiently distributing a plurality of GPUs equipped in the cloud streaming system when a video is provided through a cloud streaming service.

Additionally, the present invention can provide a cloud streaming service method capable of maximizing the effect of optimally using resources equipped in a cloud streaming system at a small cost.

Also, the present invention can provide a service to a user smoothly, based on efficient resource management of a cloud streaming system.

DETAILED DESCRIPTION

Figure 1:
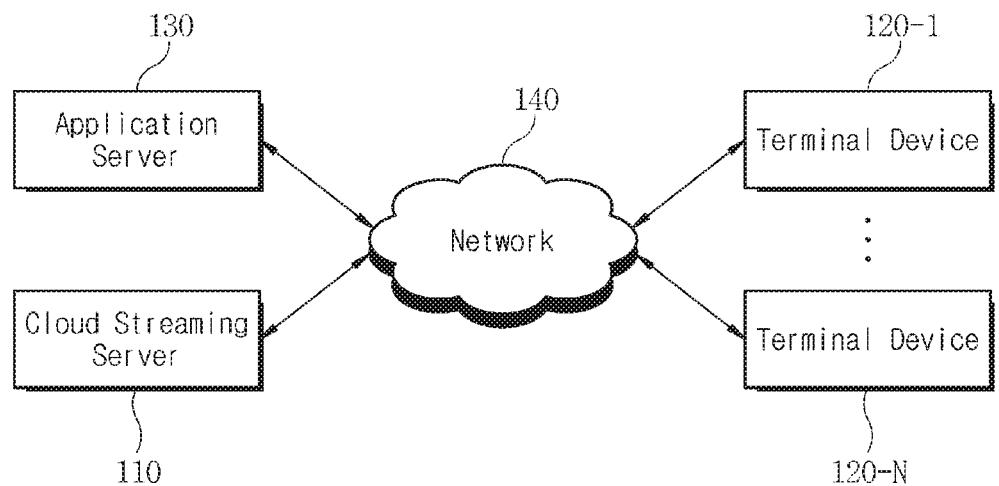
FIG. 1 is a block diagram illustrating a cloud streaming service system according to an embodiment of the present invention.

Hereinafter, preferred embodiments of the present invention will be described with reference to the accompanying drawings. However, in the following description and accompanying drawings, well known functions or elements may not be described or illustrated in detail to avoid obscuring the subject matter of this invention. Through the drawings, the same reference numerals denote corresponding elements if possible.

The terms and words used in the following description and claims are not limited to the bibliographical meanings and are merely used by the inventor to enable a clear and consistent understanding of the invention. Accordingly, it should be apparent to those skilled in the art that the following description of exemplary embodiments of this invention is provided for illustration purpose only and not for the purpose of limiting the invention as defined by the appended claims and their equivalents. Additionally, the expressions "first", "second", etc. used for specifying various elements are used for distinguishing one element from other elements and do not limit the corresponding elements.

FIG. 1 is a block diagram illustrating a cloud streaming service system according to an embodiment of the present invention.

Referring to FIG. 1, the cloud streaming service system according to an embodiment of this invention includes a cloud streaming server 110, terminal devices 120-1, . . . , 120-N, an application server 130, and a network 140.

The cloud streaming server 110 receives requests for a cloud streaming service from the terminal devices 120-1, . . . , 120-N, and provides an application execution result screen, executed in the application server 130, to the terminal devices 120-1, . . . , 120-N.

The cloud streaming server 110 determines whether a video is played on a browser. At this time, by detecting an event corresponding to a video playback occurring on the browser, it is possible to determine whether a video is played.

Also, when the video playback is sensed, the cloud streaming server 110 decodes a video by using a video decoding entity which is determined on the basis of system resource conditions. At this time, it is possible to measure usage rates of at least two or more graphics processing units (GPUs). In this case, based on the usage rates of the GPUs, a GPU having the lowest usage rate among the GPUs may be determined as the video decoding entity. In this case, when a load amount of the GPU is calculated larger, the usage rate may be measured higher. If all of the GPUs have usage rates smaller than a predetermined reference usage rate, a main GPU among the GPUs may be used to decode a video. In this case, the main GPU may have the best performance for decoding.

Additionally, the cloud streaming server 110 performs a streaming procedure corresponding to capturing, encoding and sending the decoded video and provides a cloud streaming service to the terminal devices 120-1, . . . , 120-N.

The terminal devices 120-1, . . . , 120-N receive an application execution result screen corresponding to the cloud streaming service from the cloud streaming server 110 and then provide it to users.

The terminal devices 120-1, . . . , 120-N are connected to a communication network and, based on a cloud computing system, can execute an application. The terminal devices may be, but not limited to, mobile communication terminals, information communication devices, multimedia devices, wired devices, stationary devices, and internet protocol (IP) devices. Also, each of the terminal devices 120-1, . . . , 120-N may be a mobile device having various mobile communication specifications, such as a mobile phone, a portable multimedia player (PMP), a mobile internet device (MID), a smart phone, a desktop, a tablet PC, a notebook, a net book, a personal digital assistant (PDA), a smart TV, and an information communication device.

The application server 130 may process a function of an application in response to requests received from the terminal devices 120-1, . . . , 120-N by the cloud streaming server 110, and deliver a response to processing to a web server. The application server 130 may be used by the web server to process requests, or invoked through the web server. The web server may transmit the response, received from the application server 130, to the cloud streaming server 110 through a web browser. The web browser is an application program used to retrieve information from the Internet and can be called a browser or an internet browser. The web browser includes Internet Explorer, Google Chrome, Firefox and Safari, which are currently used, and future developable web browsers.

The network 140 offers a route of delivering data between the cloud streaming server 110 and the terminal devices 120-1, ..., 120-N, including a typically used network and any future developable network. For example, the network 140 may be a wired/wireless short-range communication network for providing communication of various information devices within a limited area, a mobile communication network for providing communication between mobile entities and between a mobile entity and any other entity outside the mobile entity, a satellite communications network for providing communication between earth stations using satellites, one of wired/wireless communication networks, or any combination thereof. Meanwhile, the standard of transmission scheme for the network 130 is not limited to the existing transmission scheme standard, and may include all transmission scheme standards to be developed in the future. Also, in FIG. 1, the network used between the cloud streaming server 110 and the terminal devices 120-1, ..., 120-N may be different from or identical with a network used between the terminal devices 120-1, ..., 120-N.

Figure 2:
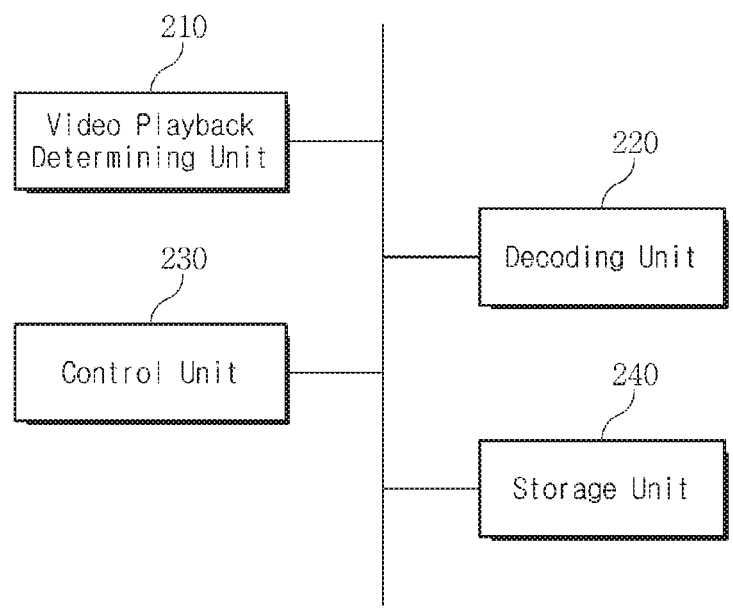
FIG. 2 is a block diagram illustrating an example of a cloud streaming server shown in FIG. 1.

FIG. 2 is a block diagram illustrating an example of a cloud streaming server shown in FIG. 1.

Referring to FIG. 2, the cloud streaming server 110 shown in FIG. 1 includes a video playback determining unit 210, a decoding unit 220, a control unit 230, and a storage unit 240.

The video playback determining unit 210 determines whether a video is played on a browser.

The cloud streaming server 110 may receive a service request from a user terminal and deliver the service request to the application server through the browser. Also, the application server may deliver a response corresponding to the service request to the cloud streaming server 110 through the browser.

The video playback determining unit may detect an event corresponding to a video playback occurring on the browser and thereby determine whether a video is played on the browser. At this time, in order to determine whether a video is played back, a hooking method for intercepting or intermediately changing a function call, a message, an event, etc. occurring between software components in various kinds of computer programs, or a method for changing a source in case of open source environments, may be used. For example, if there is an event corresponding to a video playback when hooking events from the browser, it may be determined that a video is played according to a service request of the user terminal. Also, if an application for processing the service request of the user terminal is formed of an open source, a source for creating a signal corresponding to a video playback may be added so that the cloud streaming server 110 can sense, before performing the decoding, the output of a video corresponding to the service request at the application server.

When the playback of a video is sensed, the decoding unit 220 decodes the video by using a video decoding entity determined on the basis of system resource conditions. If any video is played through a browser, the cloud streaming server 110 may receive the video by decoding and rendering. At this time, the decoding unit may perform decoding by determining, as the video decoding entity, the most effective resource in view of system resource conditions among system resources that are equipped in the cloud streaming server 110 and can perform the decoding of a video.

In this case, it is possible to measure usage rates of at least two or more graphics processing units (GPUs). Also, based on the usage rates of the GPUs, a GPU having the lowest usage rate among the GPUs may be determined as the video decoding entity.

The GPU is a 3D graphic operation dedicated processor developed to process various light source effects and texture representation techniques to make a display screen more realistic after 3D graphics are introduced in earnest. Since a plurality of GPUs may be equipped in view of system configuration, the performance of the system may greatly depend on how such GPUs are utilized. For example, let's suppose that the cloud streaming system includes three GPUs A, B and C having usage rates of 80%, 50% and 30%, respectively. In this case, if any video is played on a browser in response to a user's service request, the decoding of the video may be performed using the GPU C having the lowest usage rate among three GPUs and thereby the load amount of the system for providing the cloud streaming service may be distributed equally. Additionally, this may allow a provider to save the cost of having system resources and also allow a user to get a smooth service without delay.

In this case, the load amount of a GPU may be calculated, and the usage rate may be measured higher when the load amount is larger. For example, in each GPU, the greater the processing amount, the higher the load amount. When the load amount reaches a limit due to the large amount of processing, a bottleneck may occur in a GPU and cause a delay in service processing. Therefore, by requiring a GPU having a certain level of load amount or more to do not perform excessive service processing and also requiring a GPU having a smaller load amount, i.e., having a lower usage rate, to perform additional service processing or decoding, it is possible to prevent a service delay in advance.

If all of the GPUs have usage rates smaller than a predetermined reference usage rate, a main GPU among the GPUs may be used to decode a video. For example, if the predetermined reference usage rate is 50%, and if the usage rate of each GPU is lower than this, there is not much possibility of a bottleneck occurring in the GPU even through decoding is performed using any one of the GPUs. Therefore, in such a case, it is possible to perform the decoding of a video by using a predefined main GPU.

Among the GPUs, the main GPU may have the best decoding performance. For example, GPUs may have different processing performances depending on manufacturers or models thereof. If the cloud streaming server 110 includes two GPUs A and B having the same usage rate, and if the GPU A has better performance than the GPU B, it may be more effective to perform the decoding of a video by using the GPU A rather than perform the decoding by using the GPU B.

Therefore, when the cloud streaming server 110 has a plurality of GPUs, a GPU having the highest performance may be set as the main GPU, and if all of the GPUs including the main GPU have the usage rates lower than the predetermined reference usage rate, the decoding of a video may be performed using the main GPU having better performance.

Additionally, if the usage rate of a specific GPU other than the main GPU is 0%, namely, if there is no service being currently processed, even in cases where all of the GPUs including the main GPU have the usage rates lower than the predetermined reference usage rate, this specific GPU may be used to perform the decoding of a video. If there is any GPU that does not perform service processing at all even through the performance of the main GPU is excellent, the decoding of a video may be performed using the GPU having the usage rate of 0% so as to distribute the loads of GPUs.

The control unit 230 performs a streaming procedure corresponding to capturing, encoding and sending the decoded video and provides a cloud streaming service to user terminals. Herein, the streaming pipeline procedure corresponding to capturing, encoding and sending may be regarded as further including rendering.

The storage unit 240 stores various kinds of information created in the above-discussed cloud streaming service process according to an embodiment of this invention.

According to an embodiment, the storage unit 240 may be formed independently from the cloud streaming service 110 and support a function for the cloud streaming service. In this case, the storage unit 240 may operate as separate high-capacity storage and include a control function for the operation.

Also, the above-discussed cloud streaming server 110 may be implemented by means of one or more servers.

Meanwhile, the cloud streaming server 110 has a memory that may store information. In an embodiment, the memory is a computer-readable medium. The memory may be a volatile memory unit in one embodiment and a nonvolatile memory unit in another embodiment. In an embodiment, the storage unit is a computer-readable medium. In various different embodiments, the storage unit may include a hard disk device, an optical disk device, or any other high-capacity storage device.

Figure 3:
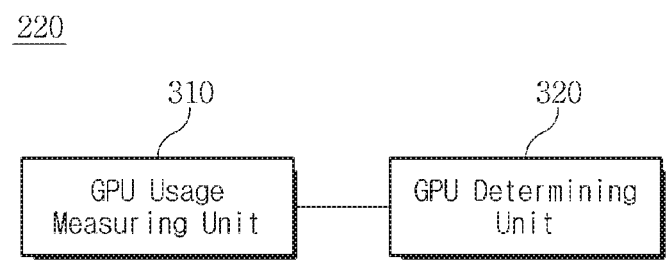
FIG. 3 is a block diagram illustrating an example of a decoding unit shown in FIG. 2.

FIG. 3 is a block diagram illustrating an example of a decoding unit shown in FIG. 2.

Referring to FIG. 3, the decoding unit 220 shown in FIG. 2 includes a GPU usage measuring unit 310 and a GPU determining unit 320.

The GPU usage measuring unit 310 measures the usage rates of at least two or more GPUs. Depending on the configuration of the cloud streaming server, there may be a plurality of GPUs. Therefore, in order to select a GPU to be used from among the plurality of GPUs, the usage rates of GPUs may be measured and used.

The GPU determining unit 320 determines, as the video decoding entity, a GPU having the lowest usage rate among the GPUs, based on the usage rates of the GPUs. The usage rate of the GPU may be in proportion to the amount of load which may occur when the GPU processes a service request. Since the GPU having a higher usage rate and thus having a larger load amount may cause any delay due to bottleneck, the GPU having the lowest usage rate may be determined as a video decoding entity for performing the decoding.

Figure 4:
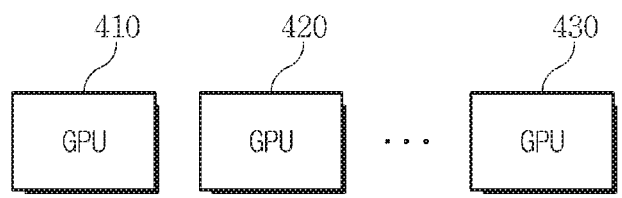
FIG. 4 is a diagram illustrating a plurality of GPUs according to an embodiment of the present invention.

FIG. 4 is a diagram illustrating a plurality of GPUs according to an embodiment of the present invention.

Referring to FIG. 4, the cloud streaming server may include N GPUs such as the first GPU 410, the second GPU 420, and the N-th GPU 430.

The GPU may perform, together with a central processing unit (CPU), processing of a user's service request in the cloud streaming server. The GPU is a 3D graphic operation dedicated processor developed to process various light source effects and texture representation techniques to make a display screen more realistic after 3D graphics are introduced in earnest. Since a plurality of GPUs may be equipped in view of system configuration, the performance of the system may greatly depend on how such GPUs are utilized.

Additionally, when the N GPUs are equipped in the cloud streaming server as shown in FIG. 4, a main GPU among the N GPUs may be set and used. From among the N GPUs, the main GPU may have the best processing performance.

The reason of setting the main GPU is as follows. For example, let's suppose that the cloud streaming server having the N GPUs as shown in FIG. 4 should perform the decoding of a video in response to a user's service request. In this case, it is possible to measure the usage rates of all the GPUs from the first GPU 410 to the N-th GPU 430 and then select the GPU having the lowest usage rate so as to perform the decoding of a video. If all the GPUs from the first GPU 410 to the N-th GPU 430 have the usage rate smaller than the predetermined reference usage rate, there may be not much possibility of a service delay occurring in the cloud streaming server even through the decoding of a video is performed using any GPU. Therefore, if any of all the GPUs from the first GPU 410 to the N-th GPU 430 can be used, the decoding of a video may be performed using the main GPU having the best processing power so as to provide the could streaming service to a user more smoothly.

Figure 5:
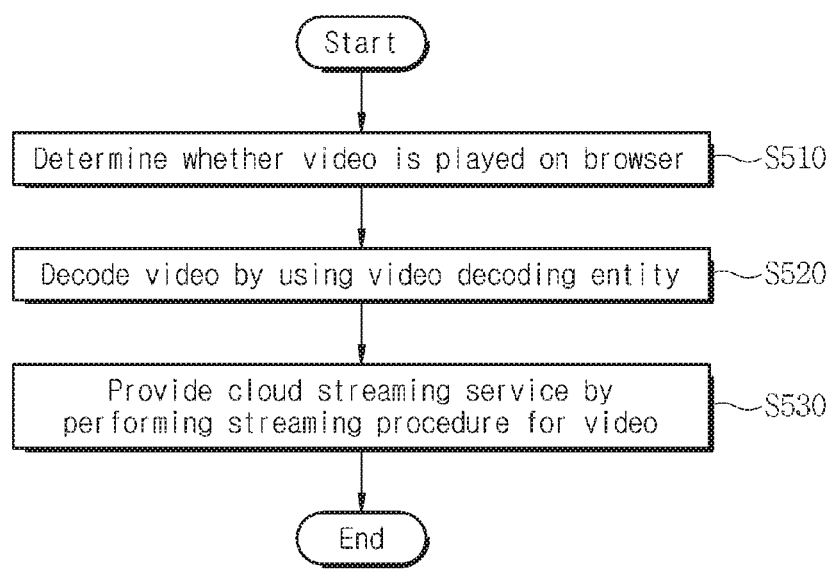
FIG. 5 is a flow diagram illustrating a cloud streaming service method using an optimal GPU according to an embodiment of the present invention.

FIG. 5 is a flow diagram illustrating a cloud streaming service method using an optimal GPU according to an embodiment of the present invention.

Referring to FIG. 5, the cloud streaming service method using the optimal GPU according to an embodiment of this invention determines whether a video is played on a browser (S510).

A cloud streaming server may receive a service request from a user terminal and deliver the service request to an application server through a browser. Also, the application server may deliver a response corresponding to the service request to the cloud streaming server through the browser.

The cloud streaming server may detect an event corresponding to a video playback occurring on the browser and thereby determine whether a video is played on the browser. At this time, in order to determine whether a video is played back, a hooking method for intercepting or intermediately changing a function call, a message, an event, etc. occurring between software components in various kinds of computer programs, or a method for changing a source in case of open source environments, may be used. For example, if there is an event corresponding to a video playback when hooking events from the browser, it may be determined that a video is played according to a service request of the user terminal. Also, if an application for processing the service request of the user terminal is formed of an open source, a source for creating a signal corresponding to a video playback may be added so that the cloud streaming server can sense, before performing the decoding, the output of a video corresponding to the service request at the application server.

Additionally, when the playback of a video is sensed, the cloud streaming service method using the optimal GPU according to an embodiment of this invention decodes the video by using a video decoding entity determined on the basis of system resource conditions (S520). If any video is played through a browser, the cloud streaming server may receive the video by decoding and rendering. At this time, the cloud streaming server may perform decoding by determining, as the video decoding entity, the most effective resource in view of system resource conditions among system resources that are equipped in the cloud streaming server and can perform the decoding of a video.

In this case, it is possible to measure usage rates of at least two or more graphics processing units (GPUs). Also, based on the usage rates of the GPUs, a GPU having the lowest usage rate among the GPUs may be determined as the video decoding entity.

The GPU is a 3D graphic operation dedicated processor developed to process various light source effects and texture representation techniques to make a display screen more realistic after 3D graphics are introduced in earnest. Since a plurality of GPUs may be equipped in view of system configuration, the performance of the system may greatly depend on how such GPUs are utilized. For example, let's suppose that the cloud streaming system includes three GPUs A, B and C having usage rates of 80%, 50% and 30%, respectively. In this case, if any video is played on a browser in response to a user's service request, the decoding of the video may be performed using the GPU C having the lowest usage rate among three GPUs and thereby the load amount of the system for providing the cloud streaming service may be distributed equally. Additionally, this may allow a provider to save the cost of having system resources and also allow a user to get a smooth service without delay.

In this case, the load amount of a GPU may be calculated, and the usage rate may be measured higher when the load amount is larger. For example, in each GPU, the greater the processing amount, the higher the load amount. When the load amount reaches a limit due to the large amount of processing, a bottleneck may occur in a GPU and cause a delay in service processing. Therefore, by requiring a GPU having a certain level of load amount or more to do not perform excessive service processing and also requiring a GPU having a smaller load amount, i.e., having a lower usage rate, to perform additional service processing or decoding, it is possible to prevent a service delay in advance.

If all of the GPUs have usage rates smaller than a predetermined reference usage rate, a main GPU among the GPUs may be used to decode a video. For example, if the predetermined reference usage rate is 50%, and if the usage rate of each GPU is lower than this, there is not much possibility of a bottleneck occurring in the GPU even through decoding is performed using any one of the GPUs. Therefore, in such a case, it is possible to perform the decoding of a video by using a predefined main GPU.

Among the GPUs, the main GPU may have the best decoding performance. For example, GPUs may have different processing performances depending on manufacturers or models thereof. If the cloud streaming server includes two GPUs A and B having the same usage rate, and if the GPU A has better performance than the GPU B, it may be more effective to perform the decoding of a video by using the GPU A rather than perform the decoding by using the GPU B.

Therefore, when the cloud streaming server has a plurality of GPUs, a GPU having the highest performance may be set as the main GPU, and if all of the GPUs including the main GPU have the usage rates lower than the predetermined reference usage rate, the decoding of a video may be performed using the main GPU having better performance.

Additionally, if the usage rate of a specific GPU other than the main GPU is 0%, namely, if there is no service being currently processed, even in cases where all of the GPUs including the main GPU have the usage rates lower than the predetermined reference usage rate, this specific GPU may be used to perform the decoding of a video. If there is any GPU that does not perform service processing at all even through the performance of the main GPU is excellent, the decoding of a video may be performed using the GPU having the usage rate of 0% so as to distribute the loads of GPUs.

Additionally, the cloud streaming service method using the optimal GPU according to an embodiment of this invention performs a streaming procedure corresponding to capturing, encoding and sending the decoded video and provides a cloud streaming service to user terminals (S530).

Herein, the streaming pipeline procedure corresponding to capturing, encoding and sending may be regarded as further including rendering.

Additionally, although not shown in FIG. 5, the cloud streaming service method using the optimal GPU according to an embodiment of this invention decodes stores various kinds of information created in the above-discussed cloud streaming service process according to an embodiment of this invention.

Figure 6:
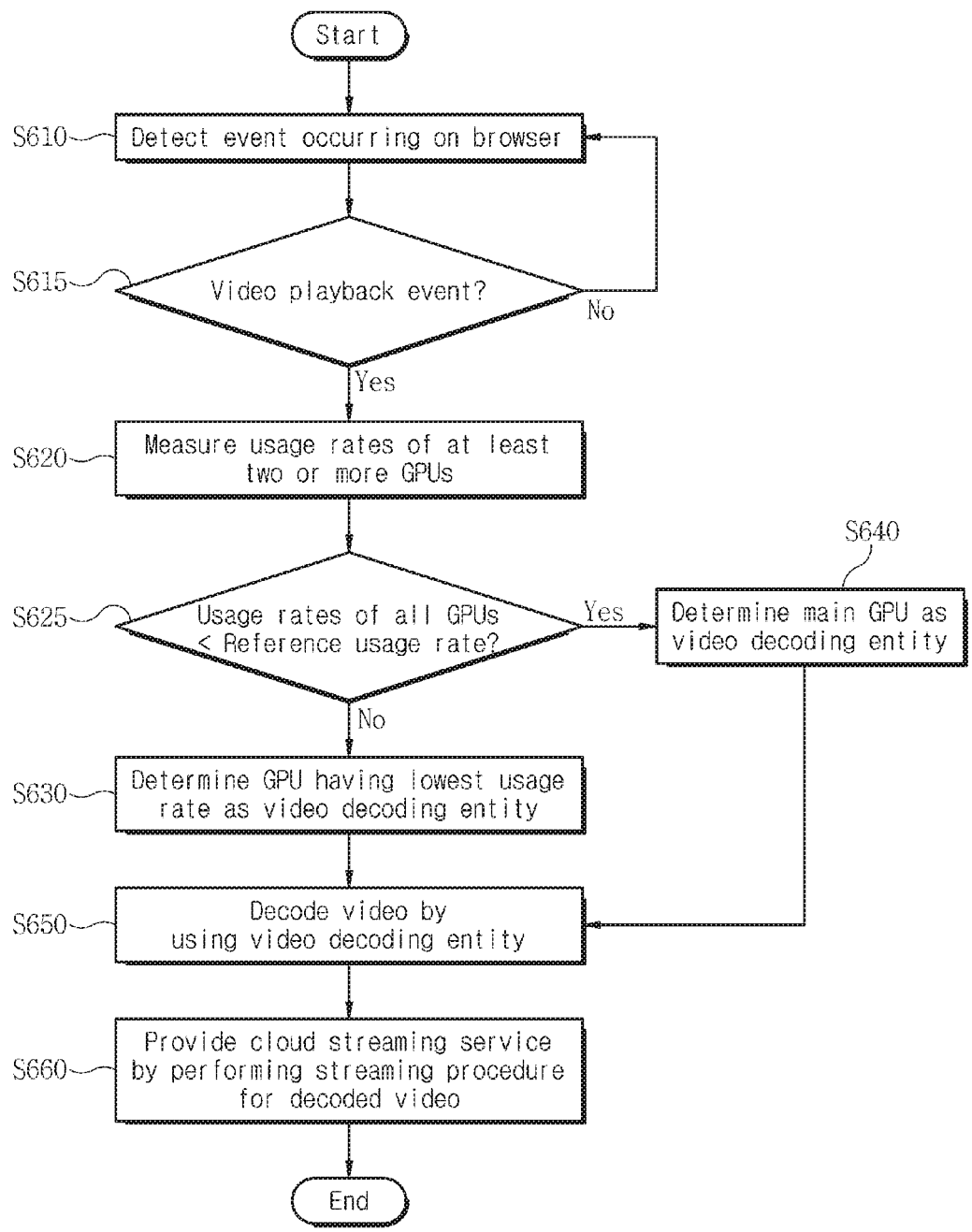
FIG. 6 is a detailed flow diagram illustrating a cloud streaming service method using an optimal GPU according to an embodiment of the present invention.

FIG. 6 is a detailed flow diagram illustrating a cloud streaming service method using an optimal GPU according to an embodiment of the present invention.

Referring to FIG. 6, the cloud streaming service method using the optimal GPU according to an embodiment of this invention detects an event occurring on a browser (S610).

Thereafter, the method determines whether a video playback event occurs on the browser (S615).

If it is determined at step S615 that no video playback event occurs, the method continuously detects an event occurring on the browser (S610).

If it is determined at step S615 that a video playback event occurs, the method measures usage rates of at least two or more GPUs equipped in a cloud streaming server (S620).

Thereafter, the method determines whether the usage rates of all the GPUs are smaller than a predetermined reference usage rate (S625).

If it is determined at step S625 that all the usage rates are smaller, the method determines a main GPU as a video decoding entity (S640).

If it is determined at step S625 that all the usage rates are not smaller, the method determines, as the video decoding entity, a GPU having the lowest usage rate among all the GPUs (S630).

Thereafter, the method decodes a video by using the determined video decoding entity (S650).

Then, the method provides a cloud streaming service to user terminals by performing a streaming pipeline procedure corresponding to rendering, capturing, encoding and sending the decoded video (S660).

The cloud streaming service method using the optimal GPU according to the present invention may be implemented in the form of program commands which may be executed through various computer means. Such program commands may be recorded on a computer-readable recording medium, which may include a program command, a data file, a data structure, etc. alone or in combination. The program command recorded on the medium is designed or configured especially for the invention, or known to those skilled in computer software. The computer-readable recording medium includes magnetic media such as a hard disk, a floppy disk, and a magnetic tape, optical media such as a CD-ROM and a DVD, magneto-optical media such as a floptical disk, and hardware devices specially configured to store and perform a program command, such as a ROM, a RAM, a flash memory and the like. In addition, the program commands may include high-class language codes, which can be executed in a computer by using an interpreter, as well as machine codes made by a compiler. This hardware device may be configured to operate as one or more software modules in order to perform the operation of this invention, and vice versa.

According to this invention, the cloud streaming service system, the cloud streaming service method using the optimal GPU, and the apparatus for the same are not limited to the above-discussed embodiments, all or parts of which may be selectively combined to make various modifications.

What is claimed is:

1. A cloud streaming server comprising:
memory; and
a processor configured to execute instructions stored in the memory and to:
determine whether a video is played on a browser;
when a playback of the video is sensed, decode the video using a video decoding entity determined on the basis of system resource conditions of graphics processing units (GPUs) of a cloud streaming service, the system resource conditions of the GPUs comprising current usage rates of the GPUs and performance of the GPUs; and
perform a streaming procedure that includes capturing, encoding and sending the decoded video and providing the cloud streaming service to a user terminal.

2. The cloud streaming server of claim 1, wherein the processor is further configured to:
measure usage rates of at least two GPUs; and
determine a graphics processing unit (GPU) having the lowest usage rate among the at least two GPUs based on the usage rates of the at least two GPUs.

3. The cloud streaming server of claim 2, wherein the processor is further configured to calculate load amounts of the at least two GPUs and to measure the usage rate higher when the load amount is larger.

4. The cloud streaming server of claim 3, wherein the processor is further configured to determine whether the video is played, by detecting an event corresponding to a video playback occurring on the browser.

5. The cloud streaming server of claim 2, wherein the processor is further configured to, when all of the at least GPUs have usage rates smaller than a predetermined reference usage rate, decode the video using a main GPU among the at least two GPUs.

6. The cloud streaming server of claim 5, wherein the main GPU is a GPU having the best decoding performance among the at least two GPUs.

7. A cloud streaming service method using an optimal GPU, the method comprising steps of:
determining, with a processor of a cloud streaming server, whether a video is played on a browser;
when a playback of the video is sensed, decoding, with the processor, the video using a video decoding entity determined on the basis of system resource conditions of GPUs of the cloud streaming service, the system resource conditions of the GPUs comprising current usage rates of the GPUs and performance of the GPUs; and
providing, with the processor, a cloud streaming service to a user terminal by performing a streaming procedure including capturing, encoding and sending the decoded video.

8. The method of claim 7, wherein the decoding step includes steps of:
measuring usage rates of at least two GPUs; and
determining, as the video decoding entity, a GPU having the lowest usage rate among the at least two GPUs, based on the usage rates of the at least two or more GPUs.

9. The method of claim 8, wherein the step of measuring the usage rates is performed by calculating load amounts of the at least two GPUs and measuring the usage rate higher when the load amount is larger.

10. The method of claim 9, wherein the step of determining whether the video is played is performed by detecting an event corresponding to a video playback occurring on the browser.

11. The method of claim 8, wherein the step of determining the GPU includes, if all of the at least two GPUs have usage rates smaller than a predetermined reference usage rate, decoding the video by using a main GPU among the at least two GPUs.

12. The method of claim 11, wherein the main GPU is a GPU having the best decoding performance among the at least two GPUs.

13. A computer program, stored in a non-transitory computer readable storage medium, that when executed, case the processor to perform the method of claim 7.

14. A cloud streaming system comprising:
a cloud streaming server comprising a processor that is configured to:
determine whether a video is played on a browser,
decode, when a playback of the video is sensed, the video by using a video decoding entity determined on the basis of system resource conditions of GPUs of a cloud streaming service, the system resource conditions of the GPUs comprising current usage rates of the GPUs and performance of the GPUs, and
provide the cloud streaming service to a user terminal by performing a streaming procedure corresponding to capturing, encoding and sending the decoded video; and
a terminal configured to receive an application execution result screen corresponding to the cloud streaming server from the cloud streaming server.

* * * * *